(12) United States Patent
Song (10) Patent No.: US 11,111,988 B2
(45) Date of Patent: Sep. 7, 2021

(54) BEARING SCREW TRANSFERRING APPARATUS

(71) Applicant: WINNER CO., LTD., Wonju (KR)

(72) Inventor: Cheun Bok Song, Wonju-si Gangwon-do (KR)

(73) Assignee: WINNER CO., LTD., Wonju (KR)

( * ) Notice: Subject to any disclaimer, the term of this patent is extended or adjusted under 35 U.S.C. 154(b) by 0 days.

(21) Appl. No.: 16/698,959

(22) Filed: Nov. 28, 2019

(65) Prior Publication Data

US 2020/0096082 A1    Mar. 26, 2020

Related U.S. Application Data

(63) Continuation of application No. PCT/KR2019/002631, filed on Mar. 7, 2019.

(30) Foreign Application Priority Data

Mar. 8, 2018  (KR) .......................... 10-2018-0027571

(51) Int. Cl.
  *F16H 25/20*  (2006.01)
  *F16H 25/24*  (2006.01)

(52) U.S. Cl.
  CPC ............ *F16H 25/20* (2013.01); *F16H 25/24* (2013.01); *F16H 2025/2081* (2013.01); *F16H 2025/2436* (2013.01)

(58) Field of Classification Search
  CPC .. F16H 25/20; F16H 25/24; F16H 2025/2081; F16H 2025/2436;

(Continued)

(56) References Cited

U.S. PATENT DOCUMENTS 2,550,721 A *  5/1951  Ritter .................. F16H 25/2261
                                                      74/424.92
4,856,356 A *  8/1989  Gartner ............... F16H 25/2295
                                                         74/25

(Continued)

FOREIGN PATENT DOCUMENTS

JP     03066962 A     3/1991
JP     H0366962 A  *  3/1991   .............. F16C 33/61

(Continued)

OTHER PUBLICATIONS

International Search Report dated Jul. 3, 2019 for PCT/KR2019/002631.

(Continued)

*Primary Examiner* — Jake Cook
*Assistant Examiner* — Gregory Robert Weber
(74) *Attorney, Agent, or Firm* — Cantor Colburn LLP (57) ABSTRACT

A bearing screw transfer device which converts a rotational motion of a screw shaft into a linear motion by the medium of a bearing is disclosed. The bearing screw transfer device has a first driving bearing and a second bearing which run along a screw groove of a rotating screw shaft, thereby converting a rotational force of the screw shaft into a translational force of an operating plate disposed on an upper portion of the screw shaft, wherein a two-surface screw groove is formed on the screw shaft, and an outer ring of the first driving bearing runs in contact with one surface of the two-surface screw groove, and an outer ring of the second driving bearing runs in contact with the other surface of the screw groove.

2 Claims, 8 Drawing Sheets

(58) Field of Classification Search
CPC .......... F16H 2025/204; F16H 25/2295; F16H 2025/2093; F16H 25/229; F16H 25/2285; F16H 25/2247; F16H 25/2261; F16C 29/005; F16C 29/043; F16C 29/04

See application file for complete search history.

(56) References Cited

U.S. PATENT DOCUMENTS

| | | | | |
|---|---|---|---|---|
| 5,732,597 | A * | 3/1998 | Devenyi | F16H 25/2003 74/424.95 |
| 5,857,383 | A * | 1/1999 | Devenyi | F16H 25/2295 74/424.94 |
| 7,946,411 | B2 * | 5/2011 | Gonzalez Alemany | B66B 23/04 198/334 |
| 9,188,211 | B2 * | 11/2015 | Yamada | F16H 25/2261 |
| 2009/0133523 | A1 * | 5/2009 | Song | F16H 25/2261 74/424.82 |
| 2018/0313437 | A1 * | 11/2018 | Semmelrath | F16H 25/2295 |
| 2019/0360565 | A1 * | 11/2019 | Lee | F16H 25/2003 |

FOREIGN PATENT DOCUMENTS

| | | | | |
|---|---|---|---|---|
| KR | 1020060006573 | A | 1/2006 | |
| KR | 100657657 | B1 | 12/2006 | |
| KR | 1020070059976 | A | 6/2007 | |
| KR | 100828235 | B1 | 5/2008 | |
| KR | 100860720 | B1 | 9/2008 | |
| KR | 100883628 | B1 | 2/2009 | |
| KR | 100919909 | B1 | 10/2009 | |
| KR | 101039623 | B1 | 6/2011 | |
| KR | 101083739 | B1 | 11/2011 | |
| KR | 101084376 | B1 | 11/2011 | |
| KR | 101150340 | B1 | 6/2012 | |
| KR | 1020130013040 | A | 2/2013 | |
| KR | 1020130038714 | A | 4/2013 | |
| KR | 1020130104955 | A | 9/2013 | |
| KR | 1020150050841 | A | 5/2015 | |
| WO | WO-0238473 | A1 * | 5/2002 | .............. F16C 33/61 |

OTHER PUBLICATIONS

Korean Office Action for corresponding Korean Patent Application No. 10-2018-0027571 dated Apr. 17, 2019.

* cited by examiner

BEARING SCREW TRANSFERRING APPARATUS

TECHNICAL FIELD

The present disclosure relates to a bearing screw transfer device, and more particularly, to a bearing screw transfer device which converts a rotational motion of a screw shaft into a linear motion by the medium of a bearing.

BACKGROUND ART

The inventor(s) of the present disclosure filed an application for a patent regarding a screw transfer device using a bearing, under Korean Patent Application No. 10-2005-0126950, and received registration of Korean Patent No. 10-0657657. Thereafter, the invention has been developed and has been disclosed in Korean Patent Laid-Open Publication No. 10-2007-0059976, Korean Patent Registration No. 10-0828235, Korean Patent Registration No. 10-0883628, Korean Patent Registration No. 10-0919909, Korean Patent Registration No. 10-0860720, Korean Patent Registration No. 10-1150340, Korean Patent Registration No. 10-1083739, Korean Patent Registration No. 10-1084376, Korean Patent Registration No. 10-1039623, Korean Patent Laid-Open Publication No. 10-2013-0013040, Korean Patent Laid-Open Publication No. 10-2013-0104955, and Korean Patent Laid-Open Publication No. 10-2015-0050841.

These inventions are configured to have a cylinder or cylindrically-arranged rods disposed on an outside of a screw shaft, and a plurality of bearings arranged on an inside of the cylinder or rod along a track of a screw thread of the screw shaft, thereby enabling the cylinder or the cylindrical rod, and the bearings arranged on the inside thereof along the track of the screw thread to perform a function of a nut. A carrier or an operating block may be attached to the cylinder or the cylindrical rod, and a load may be exerted in the carrier or the operating block. When the screw shaft is rotated by a motor, a rotational force is converted into a translational force by the bearings, and the cylinder, the carrier, and the load coupled to the bearings linearly move.

The above-described related-art bearing screw transfer devices were actually manufactured and underwent many tests, but were not commercialized due to the following problems.

The bearing screw transfer device converts a rotational force of the screw shaft into a translational force through a radial bearing (simply referred to as a "bearing" in the present disclosure) which rolls in contact with a screw groove. In this case, to transmit the rotational force of the screw shaft to the bearing, contact between an outer ring of the bearing and the screw groove of the screw shaft should be maintained under constant contact pressure (hereinafter, referred to as a "preload" in the present disclosure) enough to generate friction necessary for transmitting a force. When the contact between the screw shaft and the outer ring of the bearing is released, the force is not transmitted, and only the screw shaft idles. If the preload between the screw shaft and the bearing is excessively high, a great load may be exerted to the driving motor of the screw shaft and efficiency of conversion may greatly deteriorate. Accordingly, the essential driving condition of the bearing screw transfer device is to appropriately maintain the preload between the screw shaft and the bearing in every moment when the device is driven. In addition, all components of the bearing screw transfer device should be organically coupled to one another in order to constantly maintain the preload between the screw shaft and the bearing and to automatically or manually adjust the preload rapidly when the preload is out of an appropriate range.

However, the related-art bearing screw transfer devices have difficulty in adjusting the preload of each bearing appropriately before or after driving, and there is a problem that the preload is abruptly changed during operation.

In the related-art bearing screw transfer device, a plurality of bearings are arranged on a cylinder wrapping along a screw shaft or a rod coupled to a cap in a cylindrical arrangement, along a track of a screw groove of the screw shaft. Accordingly, all of the bearings are mechanically coupled to one another by the cylinder wrapping along the screw shaft or the rod coupled to the cap in the cylindrical arrangement, and are operated in association with one another. If a preload of one bearing is adjusted, preloads of the other bearings are changed. In particular, there are bearings at opposite points in a radial direction with reference to the screw shaft. This means that, if a preload of one bearing is adjusted, a preload of the other bearing at the opposite point in the radial direction with reference to the screw shaft is influenced. Accordingly, it is very difficult to appropriately adjust preloads of all bearings. In particular, if two or more bearings are installed on the same continuous surface on one side of the screw groove of the screw shaft, it is extremely difficult to appropriately adjust preloads of the bearings. Accordingly, in the related-art bearing screw transfer device, only one or two bearings may contribute to transmission of power, and the other bearings may remain idle.

In addition, the preload of the bearing should be adjusted only in a state in which the cylinder holing the bearings is assembled to the screw shaft. However, in the state in which the cylinder is assembled to the screw shaft, it is very difficult to precisely adjust the preload because the screw groove of the screw shaft is not exposed to the outside. This means that it is very difficult to adjust the preload during use of the related-art bearing screw transfer device even if the preload is not appropriate and power conversion and transmission are not smoothly performed.

Even if the preload of the bearing is appropriately adjusted before the related-art bearing screw transfer device is driven, the preload may be continuously changed during operation. This is because it is very difficult to continuously and constantly maintain contact between the surface of the outer ring of the bearing and the screw groove of the screw shaft. Although there are various reasons for change of the preload during operation, the biggest reason is temporary deformation of the screw shaft such as deflection of the screw shaft or shaking of the screw shaft. As described above, during operation, the related-art bearing screw transfer device is subjected to the weight of the cylinder to which the bearings are coupled, the weight of the carrier, a motion block coupled to the cylinder, and the weight of the load coupled to the carrier, the motion block. The loads of the driving blocks are continuously exerted to the screw shaft. Accordingly, temporary deformation of the screw shaft such as deflection of the screw shaft or the shaking of the screw shaft occurs during operation, and accordingly, the contact preload between the bearing and the screw shaft is changed. A bearing temporarily released from the contact with the screw shaft does not contribute to transmission of power, and a bearing contacting the screw shaft under great pressure inappropriately may degrade efficiency of power transmission.

SUMMARY

Technical Objects

The present disclosure has been developed to solve the above-described problems of the related-art bearing screw transfer device, and a first object to be achieved by the present disclosure is to provide a bearing screw transfer device which can constantly maintain contact between a surface of an outer ring of a bearing and a screw groove of a screw shaft during operation.

A second object to be achieved by the present disclosure is to provide a bearing screw transfer device which can easily adjust a preload between a surface of an outer ring and a screw groove of a screw shaft either when the device is initially assembled or when the preload is out of an appropriate range during use.

A third object to be achieved by the present disclosure is to provide a bearing screw transfer device which can minimize temporary deformation of a screw shaft, such as deflection of the screw shaft, shaking of the screw shaft, or the like during operation, by reducing a volume and a weight of a bearing nut coupled with the screw shaft.

A fourth object to be achieved by the present disclosure is to provide a bearing screw transfer device which can minimize temporary deformation of a screw shaft, such as deflection of the screw shaft, shaking of the screw shaft, or the like during operation by distributing a load of a linear transfer block without concentrating on the screw shaft.

A fifth object to be achieved by the present disclosure is to provide a bearing screw transfer device which can constantly maintain contact between a surface of an outer ring of a bearing and a screw groove of a screw shaft during operation, through an automatic self-adjustment function of a bearing nut.

A sixth object to be achieved by the present disclosure is to provide a bearing screw transfer device which can constantly maintain contact between a surface of an outer ring of a bearing and a screw groove of a screw shaft by preventing deflection, pitching, and yawing of the screw shaft during operation.

Technical Solving Means

The above-described first to third objects of the present disclosure are achieved by a bearing screw transfer device which has a first driving bearing and a second bearing which run along a screw groove of a rotating screw shaft, thereby converting a rotational force of the screw shaft into a translational force of an operating plate disposed on an upper portion of the screw shaft, wherein a two-surface screw groove is formed on the screw shaft, and an outer ring of the first driving bearing runs in contact with one surface of the two-surface screw groove, and an outer ring of the second driving bearing runs in contact with the other surface of the screw groove, wherein the first driving bearing and the second driving bearing are coupled to the operating plate symmetrically in forward and backward directions to be inclined, and all of the outer rings of the driving bearings are exposed in the forward and backward directions of the operating plate.

The above-described first to third objects of the present disclosure are achieved more effectively by the features of the present disclosure that a first upward bending wing which is bent upwardly from a front of a body of the operating plate to be inclined is formed on a front portion of the operating plate, and a first elastic plate which is bent according to a shape of the first upward bending wing and has a more extended area in an inclination direction and in parallel direction than the first upward bending wing is fixed to a lower surface of the first upward bending wing, the features that a second upward bending wing which is bent upwardly from a rear of the body of the operating plate to be inclined is formed on a rear portion of the operating plate, and a second elastic plate which is bent according to a shape of the second upward bending wing and has a more extended area in an inclination direction and in parallel direction than the second upward bending wing is fixed to a lower surface of the second upward bending wing, and the features that the first driving bearing is installed on the first elastic plate, and the second driving bearing is installed on the second elastic plate.

The above-described first to third objects of the present disclosure are achieved more effectively by the features of the present disclosure that the upward bending wings and the elastic plates are fixed only on horizontal planes, and penetrating taps are formed on the respective upward bending wings, and preload adjustment bolts are secured to the penetrating taps to adjust inclination of the elastic plates.

The above-described fourth object of the present disclosure is achieved by the features of the present disclosure that guide blocks which advance in parallel with the screw shaft, and rod-like guide rails which are inserted into inner surface of the guide blocks at least in part along a longitudinal direction are further provided on both sides of the screw shaft, and guide bearings are further coupled to the operating plate to run along the guide rails when the first driving bearing and the second driving bearing run in contact with both surfaces of the screw groove of the screw shaft.

The above-described fifth object of the present disclosure is achieved by the features of the present disclosure that a first double bending wing which is bent to be inclined downwardly and outwardly from the body of the operating plate and then is bent downwardly and inwardly is formed on one side of the operating plate, and a first upper self-adjustment plate is pivotably coupled to an upper surface of the first double bending wing, and a first lower self-adjustment plate is pivotably coupled to a lower surface of the first double bending wing, the features that a second double bending wing which is bent to be inclined downwardly and outwardly from the body of the operating plate and then is bent downwardly and inwardly is formed on the other side of the operating plate, and a second upper self-adjustment plate is pivotably coupled to an upper surface of the second double bending wing, and a second lower self-adjustment plate is pivotably coupled to a lower surface of the second double bending wing, and the feature that one guide bearing is installed on each of front and rear ends of each of the self-adjustment plates.

The above-described sixth object of the present disclosure is achieved by the feature of the present disclosure that support bearings are provided on a lower portion of the screw shaft to roll in a direction orthogonal to the shaft in contact with the screw shaft and to prevent deflection of the shaft, the feature that the support bearings include a first support bearing which is eccentric in one direction with respect to an advancing direction of the screw shaft, and a second support bearing which is eccentric in the other direction, and the feature that elastic members are coupled to a bearing shaft of the first support bearing and a bearing shaft of the second support bearing to elastically push the respective support bearings toward a center.

Advantageous Effects

According to the present disclosure having the above-described configuration, the operating plate disposed on the upper portion of the screw shaft is used as a means for supporting the driving bearings, instead of a cylinder or a rod arranged in a cylindrical shape, and the first driving bearings and the second driving bearings are coupled to the operating plate symmetrically in the forward and backward directions to be inclined, and each driving bearing is installed to run along only one surface of two surfaces of the screw groove of the screw shaft. Therefore, each of the driving bearings is not influenced by a preload of the other driving bearing, and the preload is independently maintained, such that contact between the surface of the outer ring of the driving bearing and the screw groove of the screw shaft can be constantly maintained during operation. In addition, since all of the outer rings of the driving bearings are exposed in the forward and backward directions of the operating plate, a preload between the surface of the outer ring and the screw groove of the screw shaft can be easily adjusted when the preload is out of an appropriate range, as well as when the device is initially assembled. In particular, since the preload adjustment bolts are secured into the penetrating taps of the upward bending wings of the operating plate to adjust a preload, it is very easy to adjust the preload. Once the preload is appropriately adjusted, factors causing a change in the preload are all absorbed within a predetermined range by the first elastic plate and the second elastic plate during use of the bearing screw transfer device. Therefore, the preload between the surface of the outer ring of the bearing and the screw groove of the screw shaft is maintained with a predetermined range and smooth power conversion is achieved.

In addition, since the weight of the operating plate and the weight of the carrier or operating block or the weight of the load loaded on the operating plate are distributed to the guide rails through the double bending wings of the operating plate and the guide bearing, a load exerted to the screw shaft can be greatly reduced, and accordingly, deflection of the screw shaft or shaking of the screw shaft can be prevented. Stable and secure power conversion can be achieved by minimizing a change in the preload between the screw shaft and the outer ring of the driving bearing during operation. In particular, the guide bearings are coupled to the self-adjustment plates turning around the rotary shafts. Therefore, even when parallel between the screw shaft and the guide rails is temporarily broken due to displacement of the screw shaft and pitching occurs during operation, a great change in the preload resulting therefrom is mostly absorbed by the rotation of the self-adjustment plates. Accordingly, the preload between the screw shaft and the outer ring of the driving bearing is maintained with a predetermined range, and stable power conversion is achieved.

In addition, one pair of support bearings are installed under the screw shaft, and are provided to be subjected to elastic force in the direction toward the screw shaft. Therefore, deflection of the screw shaft can be prevented, and when yawing of the screw shaft temporarily occurs during operation, the screw shaft is automatically restored to its original position, such that the preload between the screw shaft and the outer ring of the driving bearing is maintained within a predetermined range, and stable power conversion can be achieved.

DETAILED DESCRIPTION

Hereinafter, specific embodiments of a bearing screw transfer device according to the present disclosure will be described in detail with reference to the accompanying drawings.

The bearing screw transfer device according to the present disclosure includes one pair of driving bearings 311, 312 which run along a screw groove of a screw shaft 1 to convert a rotational force of the screw shaft 1 into a translational force.

Figure 1:
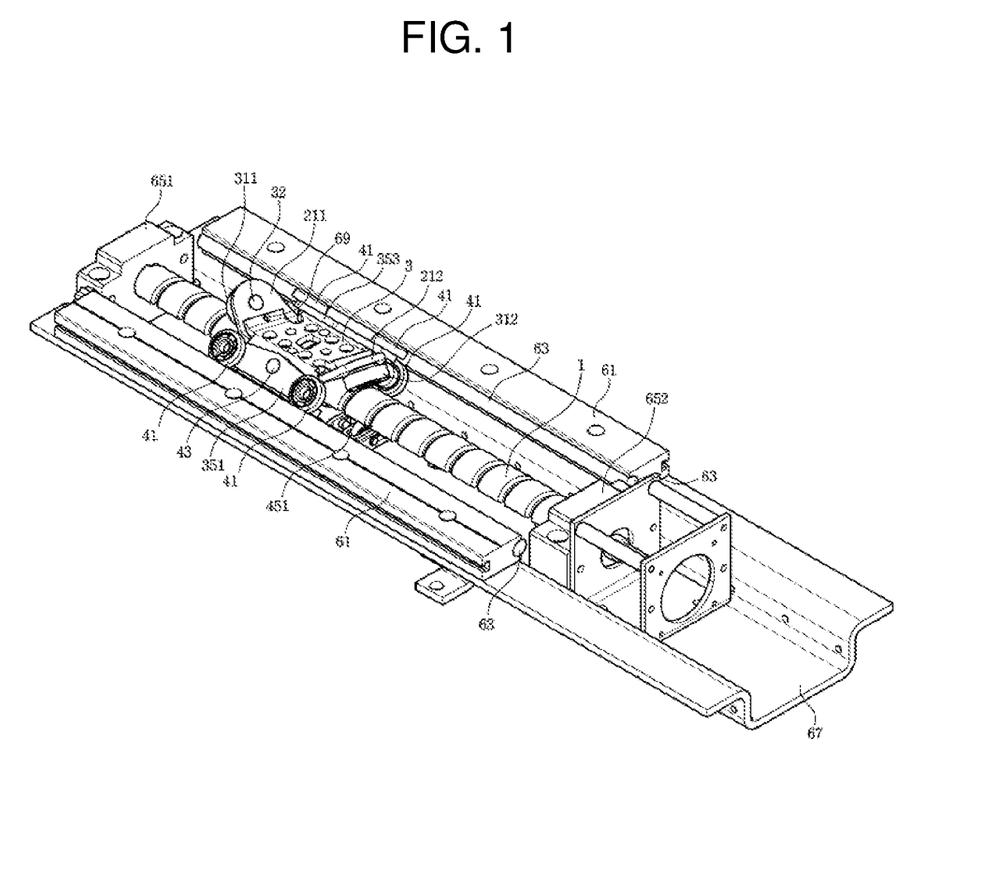
FIG. 1 is a perspective view of a bearing screw transfer device according to the present disclosure.

As shown in FIG. 1, the screw shaft 1 may be installed to have a journal supported by two shaft supporters 651, 652 which are spaced apart from each other inside a channel type frame 67. Although not shown, a driving means such as a motor, a geared motor, a geared motor may be coupled to one end of the screw shaft 1 by means of a shaft.

Both side ends of the channel type frame 67 may be extended in a horizontal direction and guide blocks 61 may be installed on the extended surfaces along a channel longitudinal direction as long as a screw forming length of the screw shaft 1, and rod-like guide rails 63 may be press-fitted into inner surfaces of the guide blocks 61 to have parts thereof inserted thereinto.

Due to this configuration, the first driving bearing 311 and the second driving bearing 312 run along the screw groove of the rotating screw shaft 1, thereby converting a rotational force of the screw shaft 1 into a translational force of an operating plate 3 disposed on an upper portion of the screw shaft 1.

Figure 2:
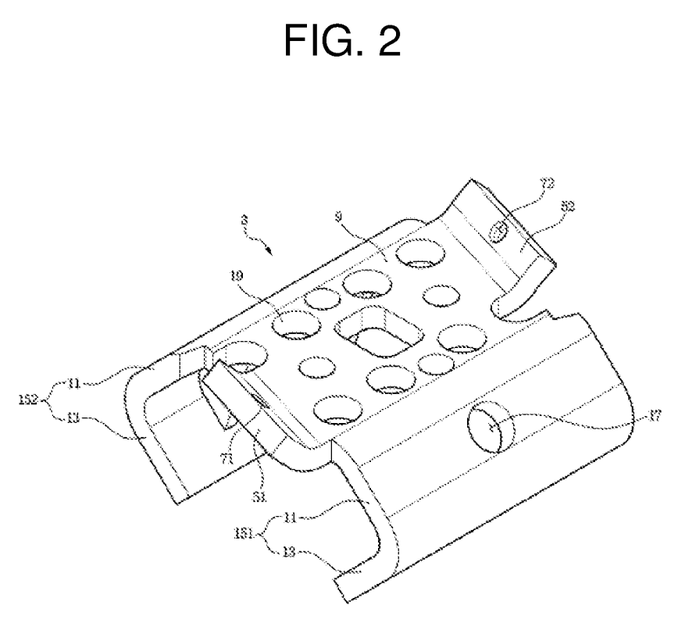
FIG. 2 is a perspective view of an operating plate of the bearing screw transfer device according to the present disclosure.

As shown in FIGS. 1 and 2, one of the features of the present disclosure is that a cylinder or a cylindrically-arranged rods is not used as a position maintaining means for the driving bearings 311, 312, and instead, the operating plate 3 disposed on the upper portion of the screw shaft 1 is used as such a position maintaining means.

Figure 4:
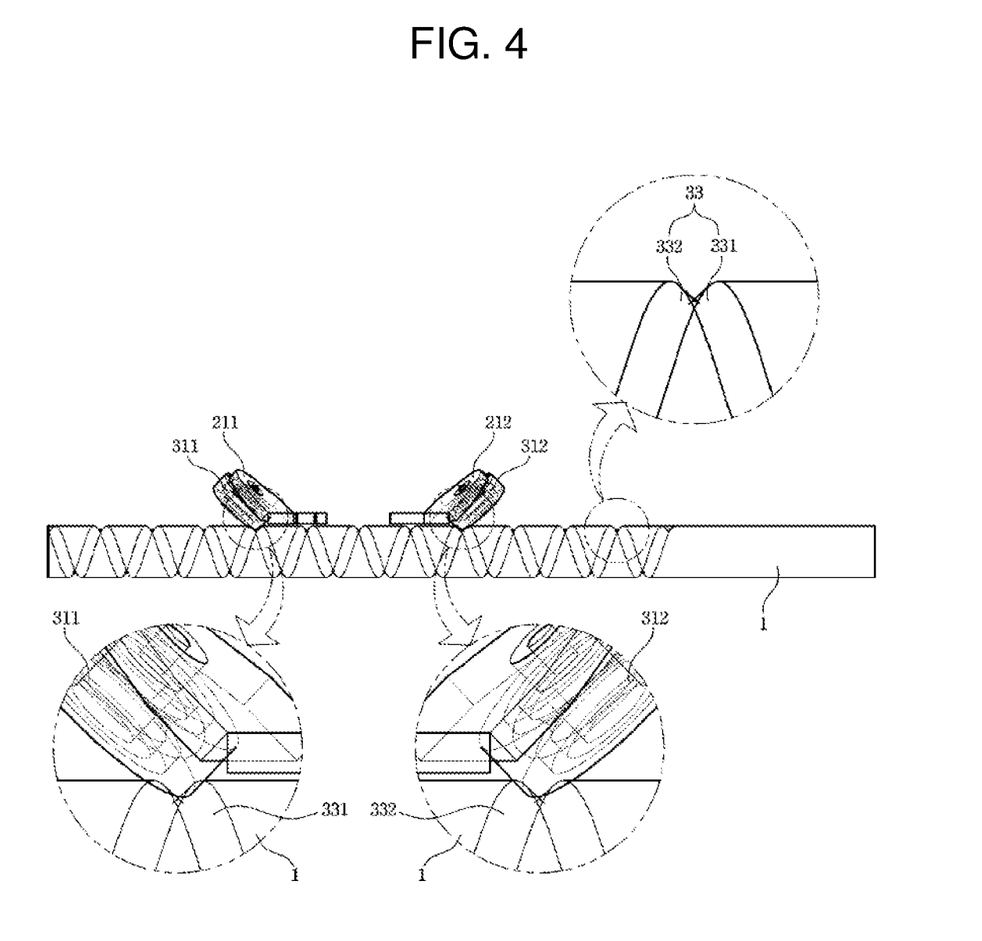
FIG. 4 is a front view illustrating an arrangement relationship between a screw shaft and driving bearings of the bearing screw transfer device according to the present disclosure.
Figure 5:
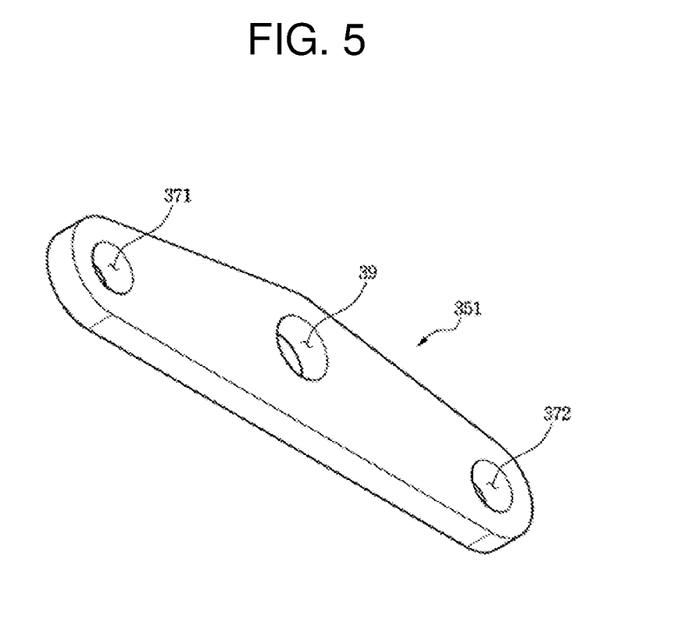
FIG. 5 is a perspective view of a self-adjustment plate of the bearing screw transfer device according to the present disclosure.

As shown in FIGS. 1 and 4, another feature of the present disclosure is that only one pair of bearings are used as the driving bearings 311, 312. Still another feature of the present disclosure is that a two-surface screw groove 33 the flanks of which have about 90° is formed on the screw shaft, and an outer ring of the first driving bearing 311 runs in contact with one surface 331 of the two-surface screw groove 33, and an outer ring of the second driving bearing 312 runs in contact with the other surface 332 of the screw groove. That is, one driving bearing runs along one screw groove surface.

Figure 8:
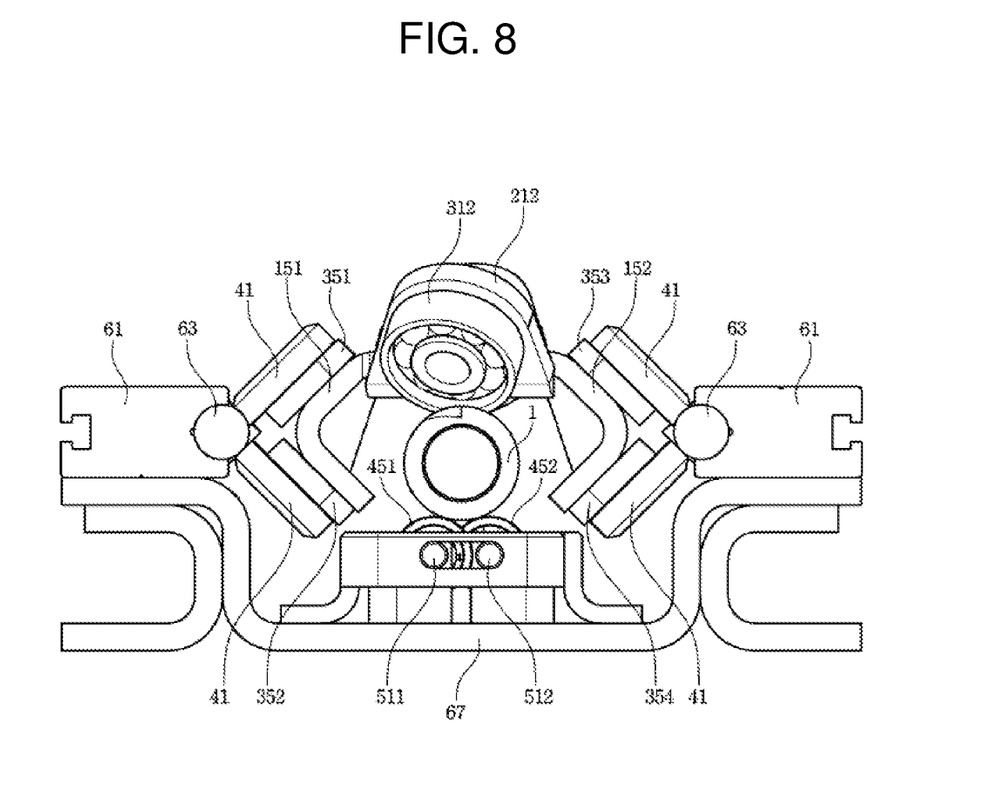
FIG. 8 is a cross sectional view of the bearing screw transfer device shown in FIG. 1.

As shown in FIGS. 1 and 8, yet another feature of the present disclosure is that the first driving bearing 311 and the second driving bearing 312 are coupled to the operating plate 3 to be symmetric in forward and backward directions and to be inclined, such that all of the outer rings of the driving bearings are exposed in the forward and backward directions of the operating plate 3. Further feature of the present disclosure is that the first driving bearing 311 and the second driving bearing 312 are installed to elastically come into contact with the screw groove 33 of the screw shaft 1.

Figure 3:
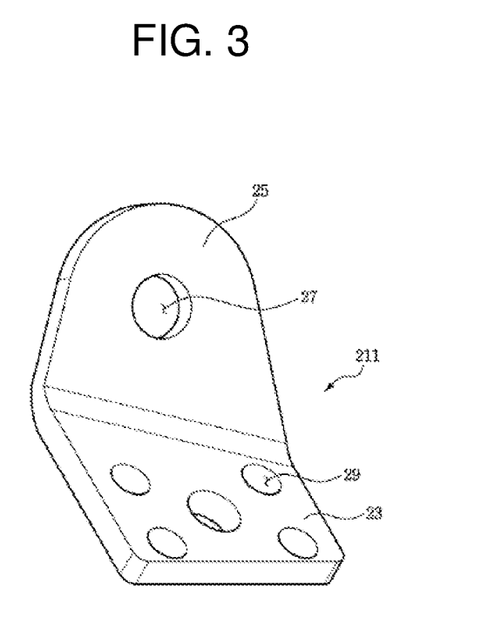
FIG. 3 is a perspective view of an elastic plate of the bearing screw transfer device according to the present disclosure.

To achieve this, as shown in FIGS. 1 to 3, a first upward bending wing 51 which is bent upwardly from the front of a body 9 of the operating plate to be inclined is formed on a front portion of the operating plate 3, and a first elastic plate 211 is fixed to a lower surface of the first upward bending wing 51. The first elastic plate 211 is bent according to the shape of the first upward bending wing 51 and has a more extended area in the inclination direction and in parallel direction than the first upward bending wing 51. The first driving bearing 311 is installed on the first elastic plate 211. In addition, a second upward bending wing 52 which is bent upwardly from the rear of the body 9 of the operating plate to be inclined is formed on a rear portion of the operating plate 3, and a second elastic plate 212 is fixed to a lower surface of the second upward bending wing 52. The second elastic plate 212 is bent according to the shape of the second upward bending wing 52 and has a more extended area in the inclination direction and in parallel direction than the second upward bending wing 52. The second driving bearing 312 is installed on the second elastic plate 212. In this case, the first upward bending wing 51 and the second upward bending wing 52 are formed to be inclined symmetrically. In this case, an angle of inclination may be about 45°, and the inclination extends outward toward the upper side. Due to this configuration, all of the driving bearings 311, 312 are exposed, and the screw groove 33 contacting the driving bearings 311, 312 is also exposed. In addition, the outer rings of the driving bearings 311, 312 elastically come into contact with the screw groove 33 by the elastic plates 211, 212 with all of the driving bearings 311, 312 and the screw groove 33 being exposed. In this case, in fixing the upward bending wings 51, 52 and the elastic plates 211, 212, only the body 9 of the operating plate and horizontal planes 23 of the elastic plates 211, 212 are fixed, and penetrating taps 71, 72 are formed on the upward bending wings 51, 52, and preload adjustment bolts 69 are secured to the penetrating taps 71, 72, such that the inclination of the elastic plates 211, 212 can be adjusted by the preload adjustment bolts 69. By doing so, a preload between the screw shaft 1 and the outer ring of the driving bearing 311, 312 can be easily adjusted when the device is initially assembled or when the preload is out of a normal range by use of the device.

Still further feature of the present disclosure is that all of a weight of the operating plate 3, a weight of a carrier or an operating block mounted on the operating plate 3, or a weight of a load loaded in the carrier or operating block is not added to the screw shaft 1, and is distributed to the guide rails 63 disposed in parallel with the screw shaft 1. Accordingly, deformation of the shaft, such as deflection of the screw shaft or shaking of the screw shaft, can be minimized during operation, and thus, contact between the screw shaft 1 and the outer ring of the driving bearing 311, 312 can be continuously maintained under constant pressure. To achieve this, the guide blocks 61 are formed on both sides of the screw shaft 1 in parallel with the screw shaft 1, and the rod-like guide rails 63 are formed on inner surfaces of the guide blocks 61 in the longitudinal direction to have parts thereof inserted thereinto. Guide bearings 41 are further coupled to side surfaces of the operating plate 3 to run along the guide rails 63 when the first driving bearing 311 and the second driving bearing 312 run in contact with both surfaces of the screw groove 33 of the screw shaft.

As shown in FIGS. 1, 2, and 8, to prevent contact between the screw shaft 1 and the driving bearings 311, 312 from being released due to downward deflection of the screw shaft 1 or pitching (vertically shaking in the longitudinal direction of the screw shaft), a first double bending wing 151 which is bent to be inclined downwardly and outwardly from the body 9 of the operating plate and then is bent downwardly and inwardly is formed on one side of the operating plate 3, and a first upper self-adjustment plate 351 is pivotably coupled to an upper surface 11 of the first double bending wing 151, and a first lower self-adjustment plate 352 is pivotably coupled to a lower surface 13 of the first double bending wing 151. The first upper self-adjustment plate 351 and the first lower self-adjustment plate 352 are rotated about a rotary shaft 43 at the center portion, and one guide bearing 41 is provided on each of both ends of each of the first upper self-adjustment plate 351 and the first lower self-adjustment plate 352 to run in contact with the guide rail 63. In addition, a second double bending wing 152 which is bent to be inclined downwardly and outwardly from the body 9 of the operating plate and then is bent downwardly and inwardly is formed on the other side of the operating plate 3, and a second upper self-adjustment plate 353 is pivotably coupled to an upper surface 11 of the second double bending wing 152, and a second lower self-adjustment plate 354 is pivotably coupled to a lower surface 13 of the second double bending wing 152. The second upper self-adjustment plate 353 and the second lower self-adjustment plate 354 are rotated about a rotary shaft 43 at the center portion, and one guide bearing 41 is provided on each of both ends of each of the second upper self-adjustment plate 353 and the second lower self-adjustment plate 354 to run in contact with the guide rail 63. Accordingly, two guide bearings 41 run in contact with an upper portion of each of the guide rails 63 in an inclined position on each of the left and the right with reference to the body 9 of the operating plate, and two guide bearings run in contact with a lower portion of each the guide rails 63 in an inclined position. When pitching of the screw shaft 1 occurs during operation, the respective self-adjustment plates 351-354 rotate with reference to the rotary shafts 43, and adjust the height of the guide bearings 41 coupled to both ends of each self-adjustment plate according to the pitching of the screw shaft 1, thereby maintaining contact between the screw shaft 1 and the driving bearings 311, 312 under constant pressure, and thus achieving smooth power conversion.

Yet further feature of the present disclosure is that a contact preload between the screw shaft 1 and the driving bearings 311, 312 is constantly maintained by preventing lateral deflection of the screw shaft 1 or yawing (horizontally shaking in the longitudinal direction of the screw shaft). To achieve this, as shown in FIGS. 1 and 8, support bearings 451, 452 are provided on a lower portion of the screw shaft 1 to roll in a direction orthogonal to the shaft in contact with the screw shaft 1 and to prevent deflection of the shaft.

Figure 6:
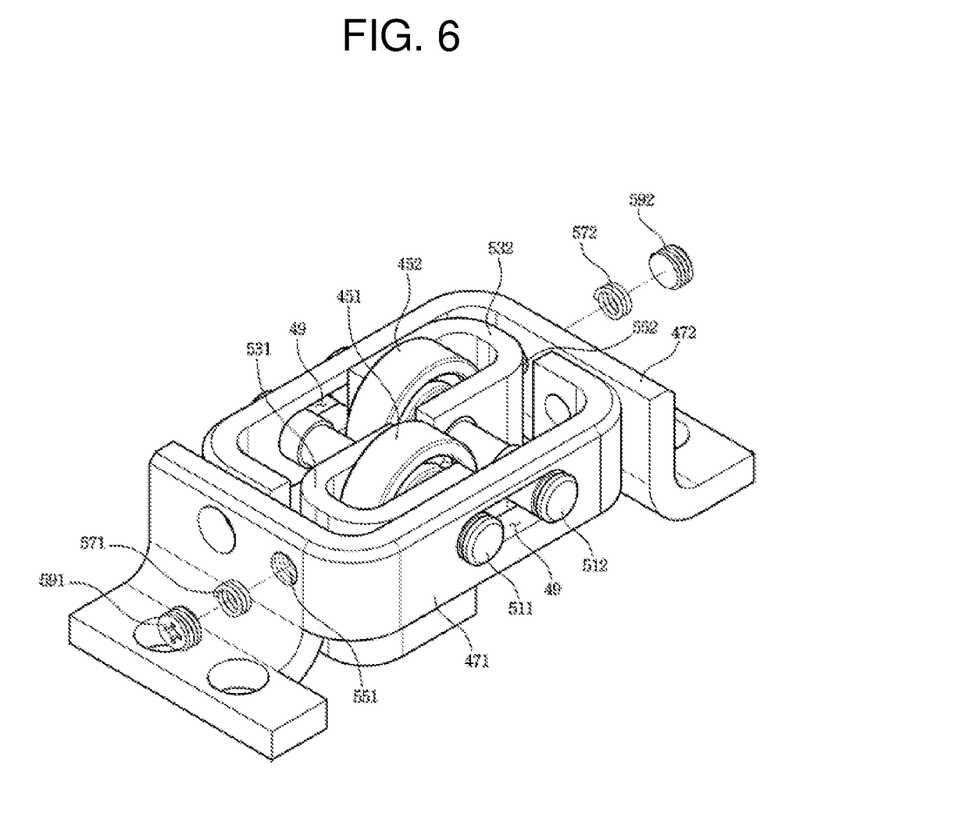
FIG. 6 is a perspective illustrating a support bearing and a support bracket of the bearing screw transfer device according to the present disclosure.
Figure 7:
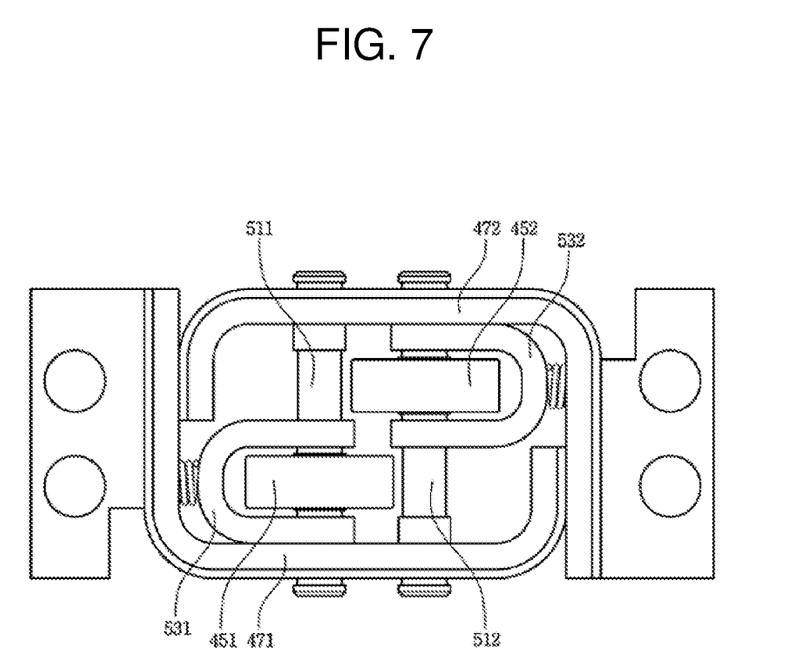
FIG. 7 is a top view illustrating the support bearing and the support bracket shown in FIG. 6.

As shown in FIGS. 6 to 8, the support bearings 451, 452 include the first support bearing 451 which is eccentric in one direction with respect to an advancing direction of the screw shaft, and the second support bearing 452 which is eccentric in the other direction, and each of elastic members 571, 572) is coupled to a bearing shaft 511 of the first support bearing 451 and a bearing shaft 512 of the second support bearing 452 to elastically push the respective support bearings toward the center. A first support bracket 471 and a second support bracket 472 may be used to maintain the first support bearing 451 and the second support bearing 452 in contact with the screw shaft 1. Slot holes 49 which are long and narrow are formed on the respective support brackets 471, 472 to receive both ends of the bearing shaft 511 of the first support bearing 451 and both ends of the bearing shaft 512 of the second support bearing 452 to allow the bearing shafts to be moved within a predetermined range in the horizontal direction. In addition, coupling parts 531, 532 extended in the lateral directions and formed in a horseshoe shape are coupled to the bearing shaft 511 of the first support bearing 451 and the bearing shaft 512 of the second support bearing 452. Penetrating taps 551, 552 are formed on sidewalls of the support brackets 471, 472 to face the coupling parts 531, 532, and the coil springs 571, 572 which are elastic members are inserted into the penetrating taps 551, 552, and may be compressed toward the coupling parts 531, 532 by set screws 591, 592. Instead of the coil springs 571, 572, plate springs may be provided on the sidewalls of the support brackets 471, 472 in contact with the coupling parts 531, 532.

According to the present disclosure, the operating plate 3 disposed on the upper portion of the screw shaft 1 is used as a means for supporting the driving bearings, and the first driving bearings 311 and the second driving bearings 312 are coupled to the operating plate 1 symmetrically in the forward and backward directions to be inclined, and each driving bearing 311, 312 is installed to run along only one surface of two surfaces of the screw groove 312 of the screw shaft. Therefore, each of the driving bearings 311, 312 is not influenced by a preload of the other driving bearing, and the preload is independently maintained, such that contact between the surface of the outer ring of the driving bearing 311, 312 and the screw groove 33 of the screw shaft can be constantly maintained. In addition, according to the present disclosure, since all of the outer rings of the driving bearings 311, 312 and the screw groove 33 of the screw shaft are exposed in the forward and backward directions of the operating plate 3, a preload between the surface of the outer ring of the driving bearing 311, 312 and the screw groove 33 of the screw shaft can be easily adjusted when the preload is out of an appropriate range, as well as when the device is initially assembled. In particular, since the preload adjustment bolts 69 are secured into the penetrating taps 71, 72 of the upward bending wings 51, 52 of the operating plate 3 to adjust a preload, it is very easy to adjust the preload. Once the preload is appropriately adjusted, factors causing a change in the preload are all absorbed within a predetermined range by the first elastic plate 211 and the second elastic plate 212 during use of the bearing screw transfer device. Therefore, the preload between the surface of the outer ring of the bearing and the screw groove of the screw shaft is maintained with a predetermined range and smooth power conversion is achieved. In addition, according to the present disclosure, since the weight of the operating plate 3 and the weight of the carrier or operating block or the weight of the load loaded on the operating plate are distributed to the guide rails 63 through the double bending wings 151, 152 of the operating plate 3 and the guide bearing 41, a load exerted to the screw shaft 1 in the gravity direction can be greatly reduced, and accordingly, deflection of the screw shaft or shaking of the screw shaft can be prevented. Stable and secure power conversion can be achieved by minimizing a change in the preload between the screw shaft 1 and the outer ring of the driving bearing 311, 312 during operation.

In particular, the guide bearings 41 are coupled to the self-adjustment plates 351-354 turning around the rotary shafts 43. Therefore, even when parallel between the screw shaft 1 and the guide rails 63 is temporarily broken due to displacement of the screw shaft 1 and pitching occurs during operation, a great change in the preload resulting therefrom is mostly absorbed by the rotation of the self-adjustment plates 351-352. Accordingly, the preload between the screw shaft 1 and the outer ring of the driving bearing 311, 312 is maintained with a predetermined range, and stable power conversion is achieved. In addition, according to the present disclosure, one pair of support bearings 451, 452 are installed under the screw shaft 1 in the orthogonal direction, and are provided to be subjected to elastic force in the direction toward the screw shaft 1. Therefore, deflection of the screw shaft 1 can be prevented, and when yawing of the screw shaft 1 temporarily occurs during operation, the screw shaft 1 is automatically restored to its original position, such that the preload between the screw shaft 1 and the outer ring of the driving bearing 311, 312 is maintained within a predetermined range, and stable power conversion can be achieved.

What is claimed is:

1. A bearing screw transfer device which has a first driving bearing and a second driving bearing which run along a two-surface screw groove of a rotating screw shaft, thereby converting a rotational force of the screw shaft into a translational force of an operating plate disposed on an upper portion of the screw shaft,
    wherein the two-surface screw groove is formed on the screw shaft, and an outer race of the first driving bearing runs in contact with one surface of the two-surface screw groove, and an outer race of the second driving bearing runs in contact with the other surface of the screw groove,
    wherein the first driving bearing and the second driving bearing are coupled to the operating plate symmetrically in forward and backward directions to be inclined, and all of the outer race of the driving bearings are exposed in the forward and backward directions of the operating plate,
    wherein guide blocks which extend in parallel to the screw shaft, and rod-like guide rails which are inserted into inner surface of the guide blocks at least in part along a longitudinal direction are further provided on both sides of the screw shaft, and
    guide bearings are further coupled to the operating plate to run along the guide rails when the first driving bearing and the second driving bearing run in contact with both surfaces of the screw groove of the screw shaft,
    wherein the guide bearings include two upper guide bearings and two lower guide bearings,
    the two upper guide bearings are arranged obliquely on a left and a right with reference to the operating plate, respectively, and in contact with upper portions of the guide rails, respectively, and
    the two lower guide bearing are arranged obliquely on the left and the right with reference to the operating plate, respectively, and in contact with lower portions of the guide rails, respectively.

2. The bearing screw transfer device of claim 1, wherein support bearings are provided on a lower portion of the screw shaft in contact with the screw shaft to prevent deflection of the screw shaft, and the support bearings are fixed on predetermined positions along an extending direction of the screw shaft, wherein the support bearings comprise a first support bearing which is eccentric in one direction with respect to the extending direction of the screw shaft, and a second support bearing which is eccentric in the other direction.

\* \* \* \* \*